April 10, 1962 F. T. PARFREY ET AL 3,028,624
APPARATUS FOR FORMING HOLLOW PLASTIC ARTICLES
Filed March 29, 1960 8 Sheets-Sheet 1

INVENTORS
FRANCIS TRIGG PARFREY
WILLIAM KENT GASH
BY
Oberlin, Maky & Donnelly
ATTORNEYS April 10, 1962   F. T. PARFREY ET AL   3,028,624
APPARATUS FOR FORMING HOLLOW PLASTIC ARTICLES
Filed March 29, 1960   8 Sheets-Sheet 2
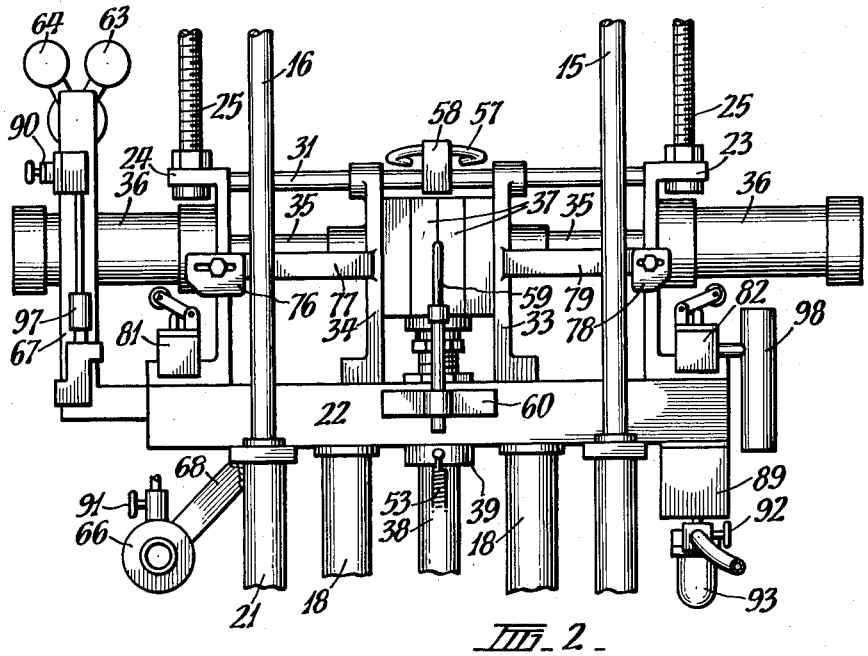
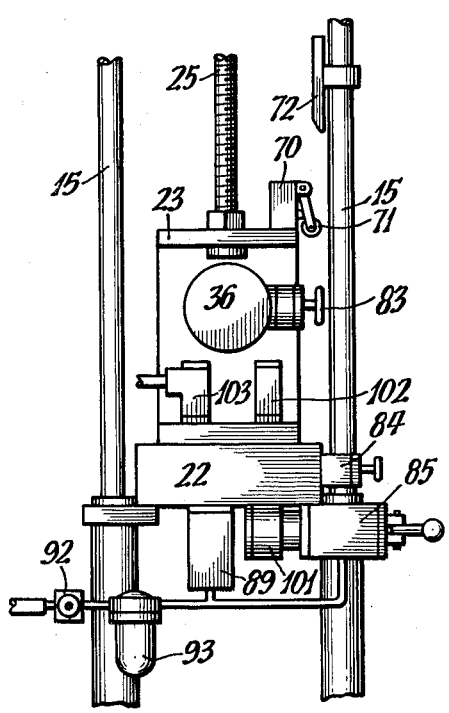
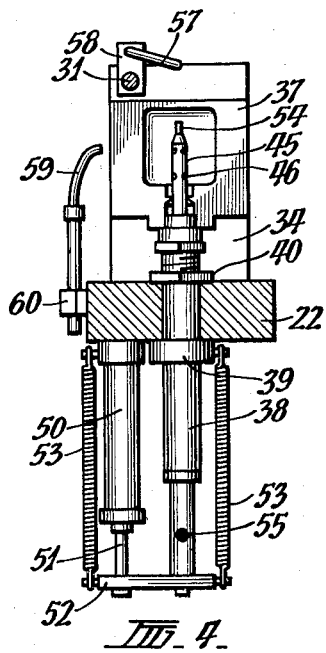
INVENTORS
FRANCIS TRIGG PARFREY
WILLIAM KENT GASH
BY
Oberlin, Maky & Donnelly
ATTORNEYS

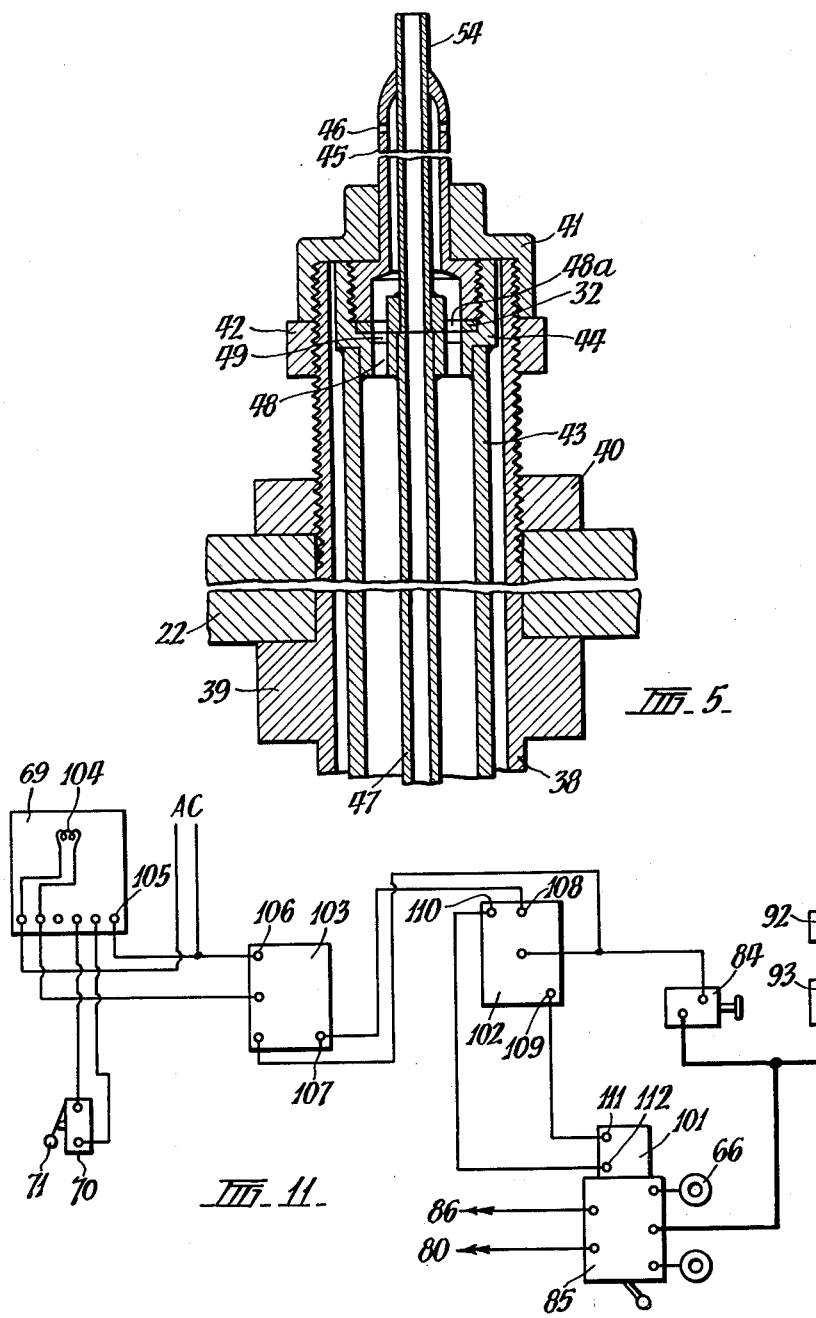

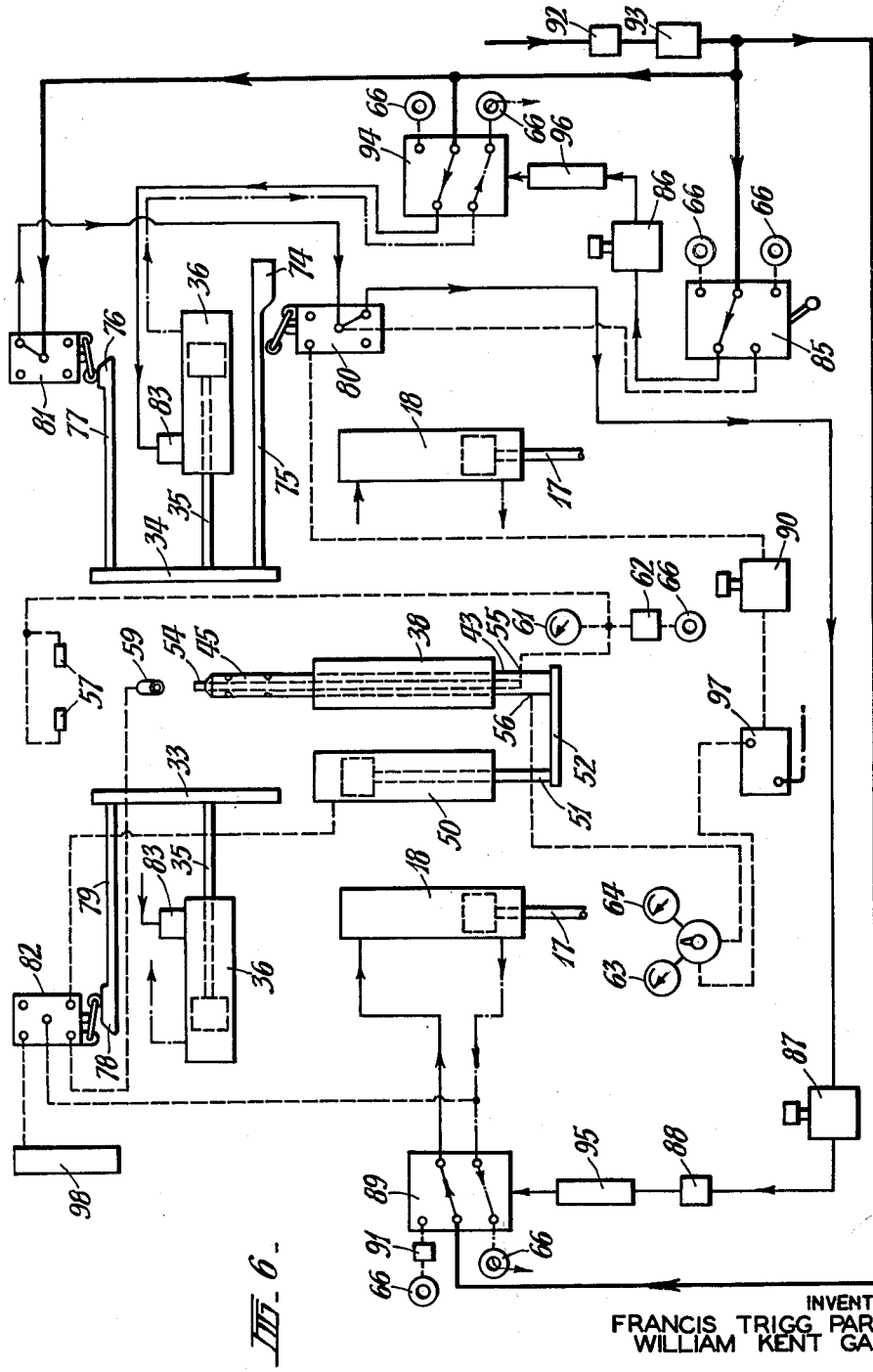

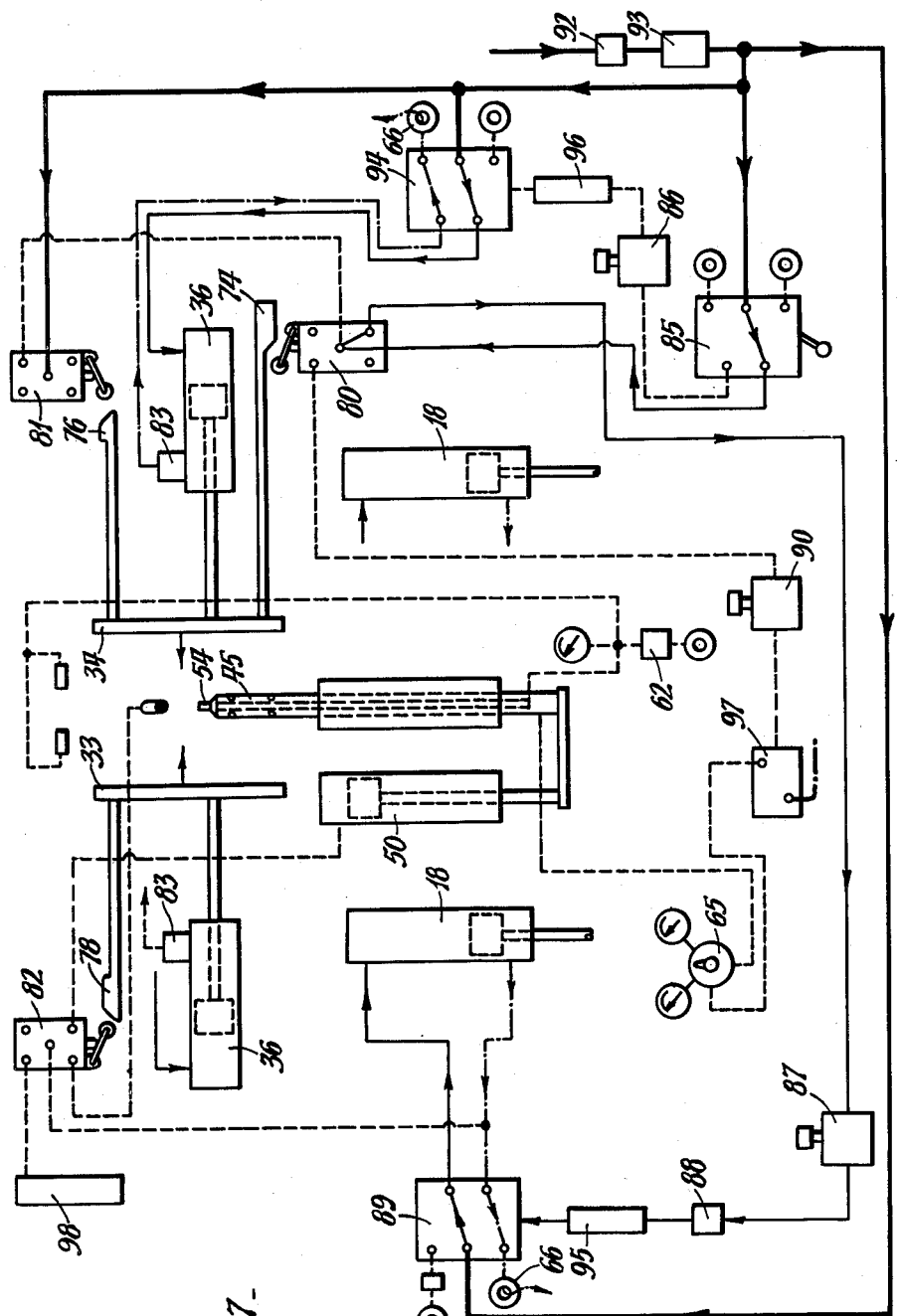

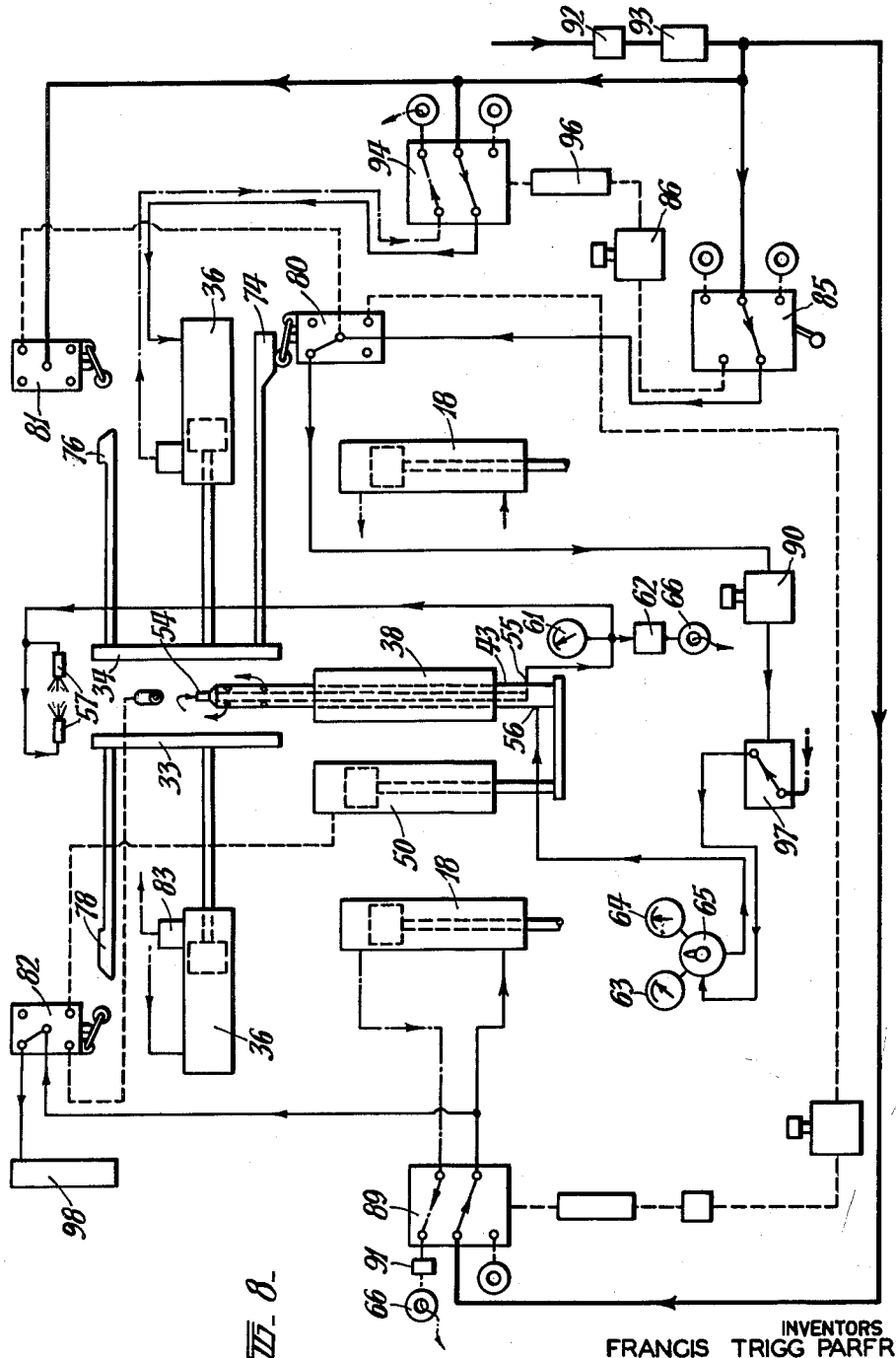

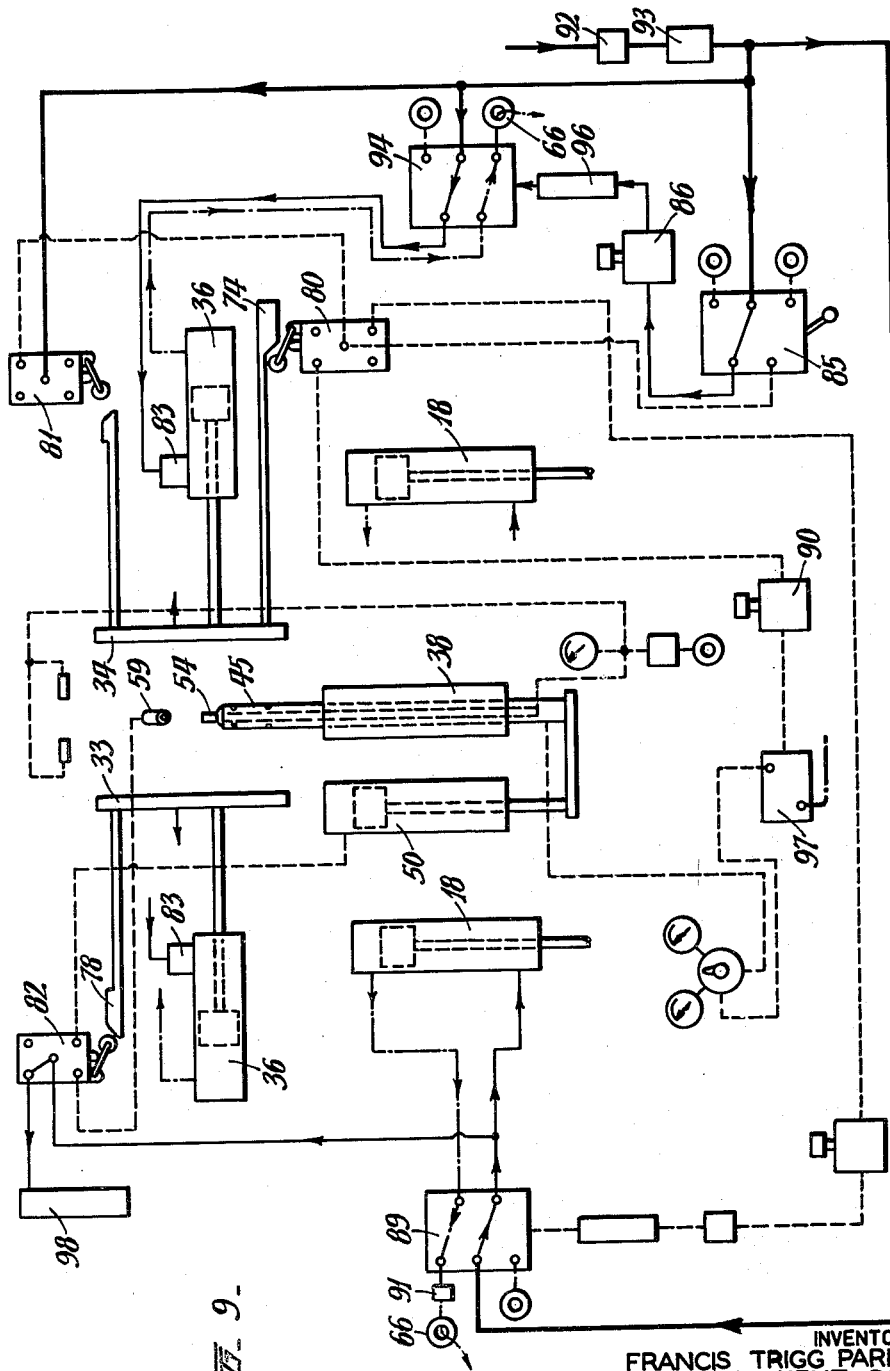

United States Patent Office 3,028,624
Patented Apr. 10, 1962

3,028,624
APPARATUS FOR FORMING HOLLOW
PLASTIC ARTICLES
Francis Trigg Parfrey, "Wangee," P.O. Box 12, Metung, Victoria, and William Kent Gash, Beaumaris, near Melbourne, Victoria, Australia; said Gash assignor to said Parfrey
Filed Mar. 29, 1960, Ser. No. 18,408
19 Claims. (Cl. 18—5)

This invention relates to apparatus for forming hollow articles and it refers particularly to machines for use in the formation of hollow articles—such as bottles and hollow toys—by the blow-moulding of organic plastic materials of the general nature of polyethylene, polyvinyl chloride, polystyrene and cellulose acetate. Such machines are well known and by way of example we mention Australian patent specifications Nos. 163,661 and 200,850 as illustrating the general type of apparatus to which we refer.

An important object of the invention is to provide improved apparatus, for the blow-moulding of hollow plastic articles, which may be set to operate automatically at a high rate of output. Another object of the invention is to provide automatic apparatus which will efficiently carry out the process of Australian patent specification No. 200,850 at a high speed or rate of output. A further object is to provide, in a blow-moulding machine of the type stated, means whereby the several operations of the machine wil be subject to individual control so that the times taken for each and every operation of the machine may be accurately adjusted independently of the other operations.

Previously, it has been the practice, in the manufacture of blow moulding machines, to provide electronic controls for actuating the several steps of the complete cycle of operations. However, such controls are not entirely satisfactory, and if a fault should develop a complete battery of machines may be put out of operation. Accordingly, we propose to provide pneumatic control means for the actuation of the different steps in a blow-moulding cycle of operations. Any suitable circuit or arrangement of the pneumatic control means may be emp'oyed.

According to one aspect of the invention there is provided a machine, for use in association with an extrusion machine—as a screw type extruder—or other apparatus for forming tubes or sheets of organic plastic material, which will operate automatically to perform the several operations required in the blow-moulding of hollow plastic articles and wherein there are provided separate means for controlling individually each separate operation of the apparatus.

In another aspect of the invention there is provided a machine, for the blow-moulding of organic plastic material to form hollow articles such as bottles, wherein there are means for opening and closing the dies, for raising and lowering or otherwise moving the platform supporting the dies away from the nozzle of an extrusion machine, and for blowing the organic plastic material to shape within the die, operated automatically in any desired sequence, which may be altered as desired, and wherein there are means for adjusting each of the different operations of the machine.

It is preferred that the machine be actuated by pneumatic pressure, which provides for greater flexibility and safety in operation than electronic means, as well as for more continuous operation, and it is a feature to provide metallic or other relatively rigid tubing for connecting together the parts of the apparatus and the control means therefor so as to provide for a high rate of output. The use of metallic tubing eliminates the time lag which occurs when flexible tubing is used due to the slight expansion of the tubing under the internal pressure of air. To eliminate the need for flexible tubing as far as possible it is preferred that all the pneumatically operated parts be mounted together on a platform, which may be movable. The movements of the platform may be effected by means of pneumatic rams so arranged that the connections thereto are made by means of rigid tubing directly from the platform. Thus, those rams may be inverted if arranged beneath the platform.

According to a further aspect of the invention there is provided a machine for the blow-moulding of organic plastic material in which there is an automatic control which when set in operation will regulate the sequence of operations of the apparatus, and also an over-riding manual control adapted to be operated independently of the automatic control so as to cause the apparatus to carry out the, or a part of the, sequence of operations under the control of the operator.

It is a further feature of the invention to provide control means whereby the opening and closing of the dies may be effected without the machine being set to carry out the remainder of its operations, thereby enabling the setting of the dies to be effected with maximum convenience.

The machine made according to the invention preferably incorporates means for regulating delay periods in the operation of the machine so that, for example, there may be provided any desired delay between the time of closing of the dies and the movement of the dies away from the extrusion nozzle of an extrusion machine, or there may be provided any suitable delay in the opening of the dies after the blow-moulding of the hollow articles to enable the formed hollow article to cool, or a delay in the commencement of the blowing operation after the dies have been closed.

The principal feature or advantage of the machine made according to the invention is its flexibility of operation so that the one machine may be conveniently used in the formation of a wide range of hollow articles.

In order that the invention may be readily understood and conveniently put into practical form we shall now describe, with reference to the accompanying illustrative drawings, a preferred construction of machine made according to the invention. In these drawings:

FIG. 2 shows a rear view of the platform carrying the die-mounting plates and apparatus for operating those plates;

FIG. 3 is a side view in the direction of the arrow 3 in FIG. 1;

FIG. 4 shows a vertical cross-section on the line and in the direction of the arrows 4—4 of Fig. 1;

FIG. 5 is a vertical cross-section through portion of the mandrel and the nozzle tube mounted therein;

Figure 10:
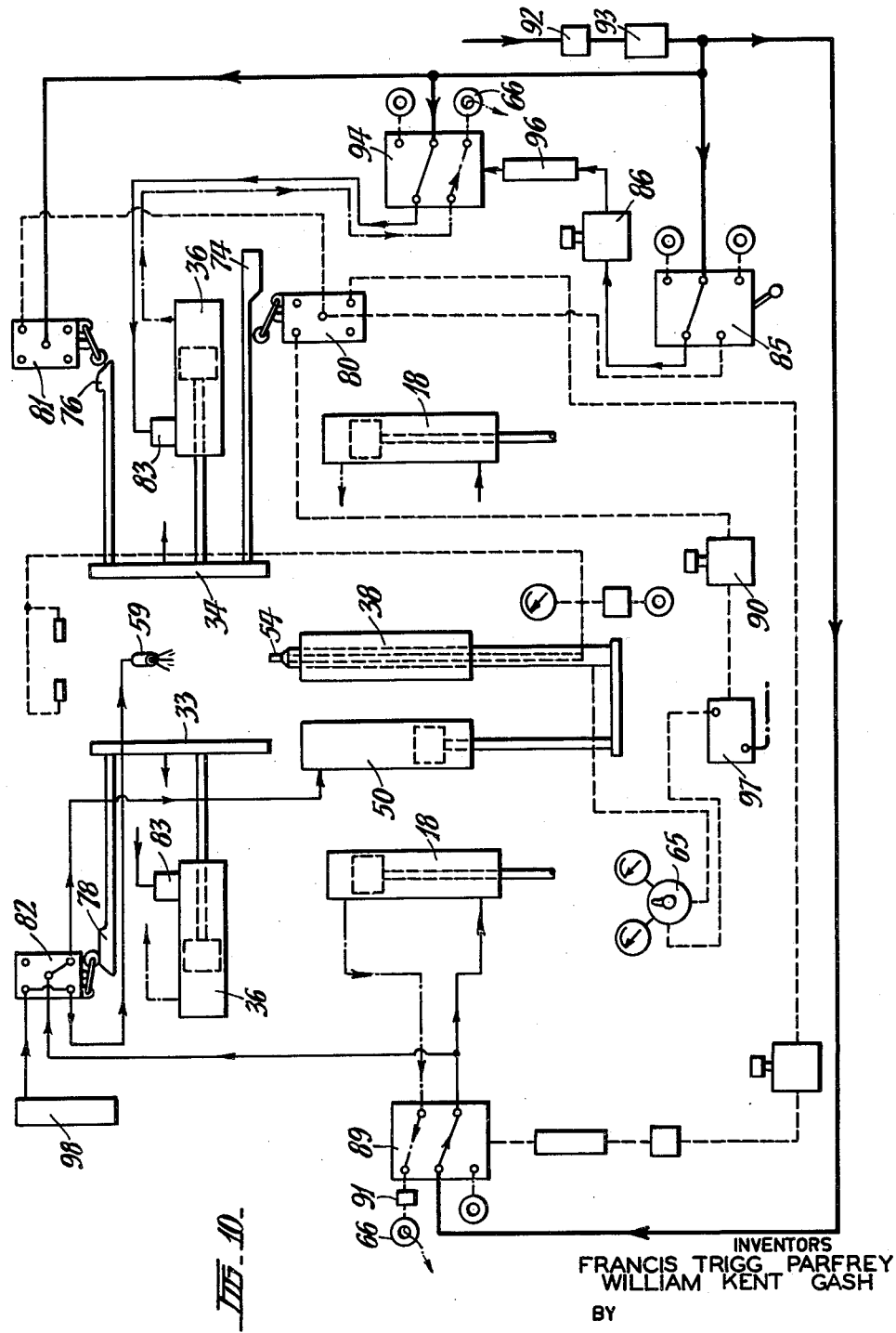

FIGS. 6 to 10 are diagrams of pneumatic operation-control circuits, illustrated by way of example only, showing the different stages or sequences in the operation of the machine, as follows: FIG. 6—press up, dies open; FIG. 7—press up, dies closing; FIG. 8—press up, dies closed, blowing; FIG. 9—press down, dies opening to first position; FIG. 10—press down, dies opening to second position;

FIG. 11 is a diagrammatic illustration of automatic control devices used to effect wholly automatic operation of the machine after it has been set up and the timing of the several operations determined.

For purposes of clarity of description we shall describe initially the structural parts of the machine, to which the invention relates, and then describe one arrangement for controlling the operation of the machine.

The machine illustrated in these drawings has a base 14 formed with holes for the reception of holding-down bolts and having fastened to it four columns 15, 16 in rectangular arrangement and the piston rods 17 of two pneumatic rams 18. A head plate 19 is fastened to the upper ends of the four columns 15, 16 so as to hold said columns in parallel relationship, and said head plate 19 is adapted to have fastened to it the output end or extrusion nozzle of a screw-type plastic extrusion machine of any suitable design—indicated by the reference 20 in FIG. 1.

Slidably fitted on each of the columns 15, 16 is a sleeve 21, and fastened to these sleeves is a platform 22, said platform being thus mounted for movement in a substantially vertical direction and being held substantially horizontal by said sleeves 21. The platform 22 is fastened to the upper ends of the cylinders of the pneumatic rams 18 so as to be movable therewith. It is to be noted that as the piston rods 17 of said rams are connected to the base 14 and the cylinders are connected to the platform 22 the cylinders and the platform move as a unit. That is done so that pneumatic connections between apparatus carried by the platform 22 and the cylinders of the rams 18 may be effected by means of metallic tubing, and there is no need to use flexible tubing in making such connections.

Two brackets 23, 24 are fastened to the upper surface of the platform 22, at opposite sides thereof, and secured to each of those brackets is a screw-threaded rod 25 having upper and lower stops 26, 27 fitted adjustably thereon. Lock nuts 28 are provided for locking the stops in adjusted position, and each stop has a resilient pad or buffer 29 on its operative surface. The rods 25 fit through stop brackets 30 mounted at the upper ends of the columns 15, 16 immediately below the head plate 19. It is apparent that vertical movements of the platform 22, due to the pneumatic rams 18, will be limited by interaction of the stops 26, 27 with the stop brackets 30. The length of stroke of the pneumatic rams 18—the distance of vertical travel of the platform 22—may be readily adjusted by operation of either or both pairs of stops 26, 27. If desired, a guard may be detachably mounted so as to fit about each of the rods 25 and the stops 26, 27 thereon.

The two brackets 23, 24 are so mounted that their inner, vertical surfaces are substantially parallel and a guide rail 31 is fastened to the brackets 23, 24 so as to be parallel to the upper surface of the platform 22. Two die-mounting plates 33, 34 are mounted slidably on the guide rail 31 so as to slide on the upper surface of the platform 22, and these two plates 33, 34 are fastened to the inner ends of a pair of piston rods 35 of pneumatic rams 36 that are mounted on the brackets 23, 24. The rams 36 are so arranged, and adapted to operate, that the die-mounting plates may be moved inwardly or outwardly—to die-closed or die-opened position, respectively—by operation of said rams 36. Each of the die-mounting plates 33, 34 is adapted to have fastened to it part of a blow-moulding die—indicated by the reference 37. The two die parts 37 constitute the die for the formation of a hollow article.

Midway between the two brackets 23, 24, and on about the transverse centre line of the platform 22, is an opening in the platform 22, and mounted in that opening is a mandrel mounting cylinder 38 having a fixed collar 39 that fits below said platform 22. The cylinder 38 is secured in substantially vertical position by means of a clamping ring 40 fitted to the upper end portion of the cylinder. Detachably fitted to the screw-threaded upper end portion of the cylinder 38 is a locating bush 41, said bush being made to suit the die parts 37 and the neck of the bottle or other hollow article which is to be formed in the die parts 37; and it is detachably fitted to the cylinder 38 so that it may be removed and replaced by another bush. That bush 41 is secured in position by a lock ring 42.

A tubular member 43, having at its upper end a mandrel head 44, is mounted slidably in the cylinder 38. The mandrel head 44 is internally screw-threaded so that a hollow mandrel 45 may be screwed into it. The mandrel 45 is made to suit the internal diameter of the neck of the bottle or other hollow article to be formed and in normal usage of the machine the mandrels have to be changed from time to time as the machine is used for blow moulding different articles. Thus, any one of a number of different mandrels may be screwed into the mandrel head 44. Each of the hollow mandrels has air holes 46 through which may flow air for the blowing to shape of the plastic material in the die parts 37, and for the cooling of the formed hollow article. These air holes 46 are varied according to particular requirements, and the lower set of holes 46 is provided so that air may be blown on to the lower end portion of the article in the die 37 so as to cool that end. The mandrel 45 is a neat sliding fit in the locating bush 41 and the lower end of the tubular member 43 is a neat sliding fit in a gland or bush at the lower end of the cylinder 38.

Also fastened to the mandrel head 44 is a co-axial tube 47 which extends downwardly through the tubular member 43, and several holes 48 are provided in the mandrel head 44, about the co-axial tube 47. In the outer end surface of the mandrel head 44 is a circular groove 49 with which the holes 48 communicate. A nozzle tube 54, of smaller external diameter than the internal diameter of the mandrel 45, is mounted in said mandrel 45, said tube having at its inner end a boss with an outwardly-extending flange 32 provided with several openings 48A which communicate with the groove 49. Thus, air can flow through the holes 48 into the channel 49 and thence through the openings 48A to the interior of the mandrel 45. The nozzle tube 54 is held in position by the pressure of the inner end of the mandrel 54 upon the flange 32.

The locating bush 41, mandrel 45 and nozzle tube 54 are supplied as a set, to suit the die parts 37 and when the die parts 37 are changed it will generally be necessary to change the bush 41, mandrel 45 and nozzle tube 54.

Also fastened to the lower surface of the platform 22 is the cylinder of a mandrel-moving pneumatic ram 50 having a piston 51 which is connected to the lower end of the tubular member 43 by means of a plate 52; see FIG. 4. Tension springs 53 are connected to the plate 52 and to anchorage pins on the cylinder 38 and cylinder of the ram 50. The ram 50 is operative to force downwardly the tubular member 43 and hollow mandrel 45, and the springs 53 are operative to move the tubular member 43 and mandrel upwardly when air pressure within the upper end of the ram is relieved.

An air outlet connection 55 is taken from the lower end of the co-axial tube 47, through the wall of the tubular member 43, and an air inlet connection 56 is provided in the lower end portion of the tubular member 43 at a location substantially diametrically opposite the outlet connection 55.

Thus, there are provided means for raising and lowering the platform 22 and the apparatus carried thereby (such means comprising the pneumatic rams 18), means for closing and opening the die mounting plates 33 and the die parts 37 fastened thereto (the pneumatic rams 36), and for raising and lowering the hollow mandrel 45 with the nozzle tube 54 therein (the springs 53 and ram 50). The hollow mandrel 45 and the nozzle tube 54 provide means for blowing air or other fluid into the plastic material that is to be blow-moulded and for exhausting that fluid therefrom.

In order to assist in the cooling of the extruded material immediately above the tops of the die parts 37 we provide a somewhat C-shaped tube 57 mounted in a block 58 which is fastened to the guide rail 31, at about the middle thereof. The opposite ends of the tube 57 constitute blowing nozzles so directed that air from them will impinge on the extruded material.

For the purpose of ejecting the formed hollow articles from the machine, after the mandrel 45 has been forced downwardly at the conclusion of the blowing and cooling operations, we provide a nozzle 59 that is mounted at the rear of the platform 22 by means of the bracket 60. The nozzle 59 is so arranged that a blast of air from it will impinge upon the formed hollow article located between the die parts 37 and cause it to fall forwardly—into a bin conveniently located at the base of the machine.

The parts described above constitute the principal structural parts of the machine. In addition, there is a pressure gauge 61 for indicating the pressure of air or other fluid exhausted through the nozzle tube 54 from within the formed hollow article, a regulator valve 62 for adjusting the pressure of that exhaust fluid, a pressure gauge 63 for indicating the pressure of air or other fluid used for the blowing of the hollow articles, a pressure gauge 64 for indicating the fluid pressure available for that purpose, a regulator valve 65 for adjusting the operating pressure of that "blowing" fluid, a silencer 66, a bracket 67 supporting the gauges 63, 64 and regulator valve 65, arms 68 supporting the silencer 66, an electronic timer 69 for regulating the blowing time required in the formation of hollow articles, and a switch 70 with an actuating lever 71 and an associated ramp 72 for re-setting the electronic timer 69 each time the platform 22 is raised to its top position. As can be seen in FIG. 3 the timer re-setting switch 70 is mounted on the bracket 23 and the ramp 72 is mounted adjustably on the front column 15. There is also an electric pilot valve 73 associated with the electronic timer 69.

In order to provide for automatic actuation of different operations in the blow-moulding operations we provide valve actuating cams which operate their separate valves in the opening and closing movements of the die-mounting plates 33, 34. These valve actuating cams, indicated by the references 74, 76 and 78 are mounted adjustably at the outer ends of supporting arms 75, 77 and 79, respectively. The arm 75 is fastened, as by welding, to the front edge of the die-mounting plate 34, the arm 77 is fastened to the rear edge of the same die-mounting plate, and the arm 79 is fastened to the rear edge of the die-mounting plate 33. The cam 74 is associated with, and adapted to actuate, a control valve 80; the cam 76 is adapted to actuate a control valve 81; and the cam 78 is adapted to actuate a control valve 82.

Each of the pneumatic rams 36 for controlling the opening and closing movements of the die parts 37 has a control valve 83 by means of which may be regulated the rate of exhaust of air from the inner end of the cylinder and therefore the rate of closing of the die parts 37.

Mounted on the front of the machine, at handy locations so as to permit of convenience of adjustment and/or of operation are an automatic control valve 84 which, when operated, switches the machine on to automatic operation; a manual control valve 85 by means of which the machine may be operated manually; a control valve 86 for controlling the delay in the opening of the die parts during the blowing operation; a control valve 87 for controlling the delay before the platform 22 drops away from the extruder 20; and a needle valve 88 for controlling the flow of air to a valve 89 which operates the pneumatic rams 18 and, therefore, the vertical movements of the platform 22. The needle valve 88 may be closed when the platform 22 is in its lowermost position so as to prevent upward movement—as when the die parts 37 are being set up and the opening and closing movements of the die parts 37 are being regulated.

Figure 1:
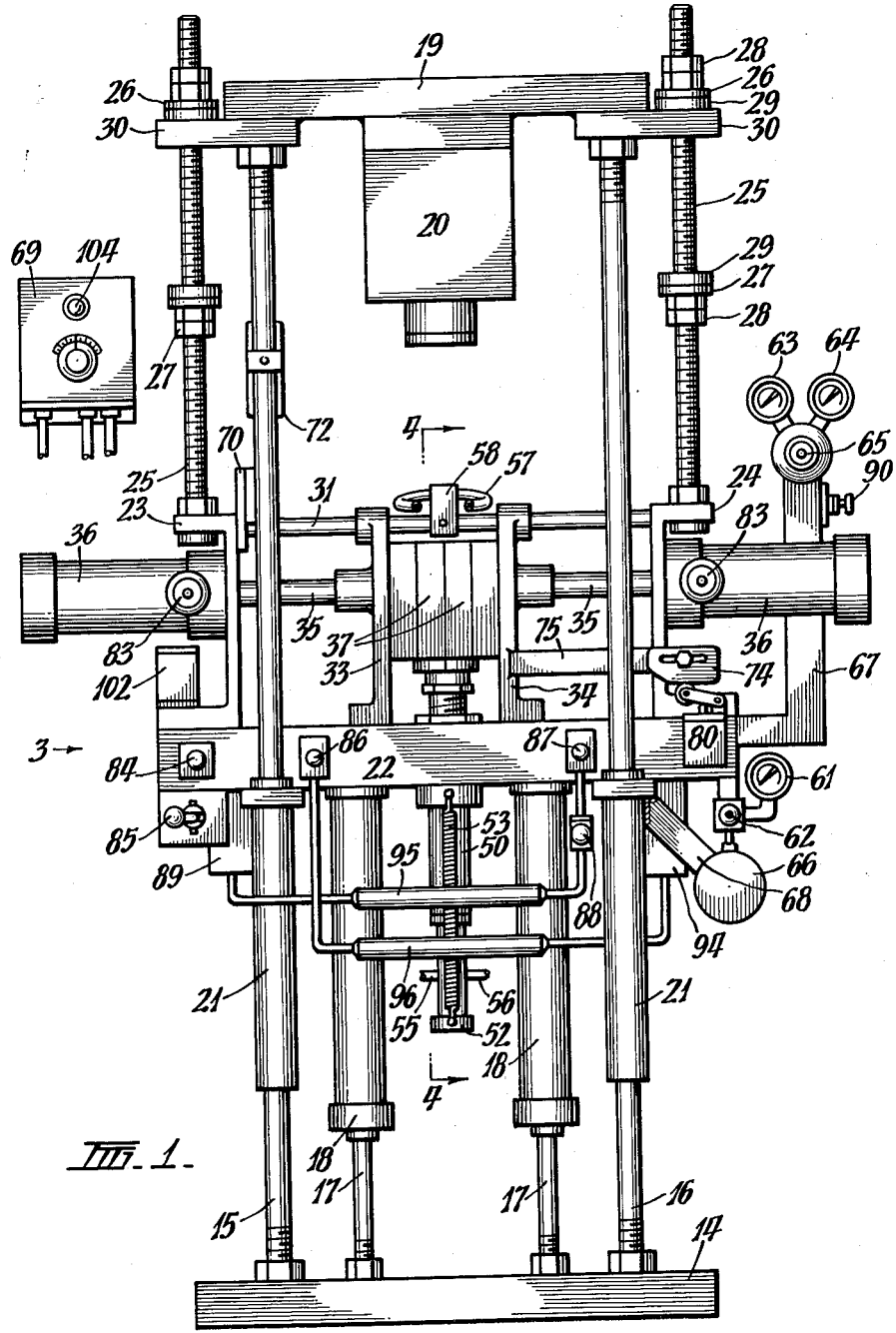
FIG. 1 is a view in front elevation showing the structural parts of the machine but omitting the major part of the pneumatic control valves and pipe lines, or operation-control parts.

At the right hand side of the machine—as seen in FIG. 1—is a control valve 90 for controlling the delay between the closing of the die-parts 37 and the commencement of the blowing operation, and at the rear of the machine, above the silencer 66, is a valve 91 for regulating the rate of downward movement of the platform 22.

There are also a number of other control valves, pilot valves and air supply lines, not shown in the FIGURES 1 to 5 which illustrate the structural parts and the arrangement of the principal control devices. The pneumatic circuits and air-flow diagrams for the different stages in the operation of the machine are depicted in FIGS. 6 to 10, to which reference will now be made. The arrangement of the pneumatic devices—that is to say, the pneumatic circuit—although necessary for the operation of the machine, does not constitute a part of our invention and other circuits or arrangements of the apparatus may be used.

When the machine is being set up for operation, and when the main air supply has been disconnected or switched off, the platform 22 is initially in its lowermost position, the die parts 37 are open and the mandrel 45 is in its extended or upper position relative to the platform 22. The main air supply is connected to a main valve 92 preferably mounted at the left hand side of the machine, behind and below the manual control valve 85—see FIG. 3. From that main valve 92 the supply line leads to a lubricator 93, of a type such that air from the main valve 92 to the several operating valves in the machine will pick up a small quantity of lubricant which is then carried to the operating mechanism so as to ensure that there is adequate lubrication of the working parts.

When the main valve 92 is open, air—preferably dry air—under pressure, as between 100 and 125 pounds per square inch, can flow through the lubricator 93 to the manual control valve 85, to a valve 94 controlling the movements of the die parts 37, to the valve 89 controlling the vertical movements of the platform, and to the cam-operated valve 81—these connections being virtually in parallel. For convenience of installation the valve 94 is mounted below the platform 22 at the right-hand side of the machine.

On the opening of the main valve 92 to enable the machine to be operated—the platform 22 being in its lowered position—air is piloted from the cam-actuated valve 80 through the delay control valve 87, through the open needle valve 88, through an air reservoir 95 mounted at the front of the machine and to the lift control valve 89 so as to actuate that valve 89 and thereby direct the main air supply through that valve to the upper ends of the cylinders of the cams 18, thus causing the platform 22 to be raised. Of course, if it be desired to keep the platform 22 in its lowered position it is necessary merely to close the needle valve 88 so that the lift control valve 89 is not operated, when the main air supply through the valve is directed to the lower ends of the rams 18 to hold the platform 22 in that lowered position.

It is to be noted that the two exhaust outlets of each of the manual control valve 85, die control valve 94 and lift control valve 89 are connected to the silencer 66 and that one of the connections from the lift control valve 89 to the silencer—that for the exhaust of air from the tops of the ram cylinders—is through the regulator valve 91 which may be adjusted so as to regulate the rate of drop of the platform 22.

At that stage, with the platform 22 raised and the manual control valve 85 in the "die open" position, the air circuit is as shown in FIG. 6. There is, then, no air in the line from the manual control valve 85 to the cam-actuated valve 80, or in the circuits to, or controlling the operation of, the hollow mandrel 45. Air is piloted from the manual control valve 85 through the delay control 86 and a second reservoir 96 to the die control valve 94, and the setting of that valve 94 is such that air from the main air supply is directed to the inner ends of the cylinders of the rams 36, ensuring that the die mounting plates 33, 34 are kept open.

It is to be noted that even if the die mounting plates 33, 34 were initially in the closed position—when there would be no air piloted from the cam-actuated valve 81 through the valve 80 to the lift control valve 89—the initial flow of air on the opening of the main valve 92 would cause the die mounting plates 33, 34 to be moved to the open position so that the cam-actuated valves 81 and 80 would be operated to provide for the piloting of air to the lift control valve 89.

The next stage in the sequence of operations is shown in FIG. 7. The operating handle of the manual control valve 85 has been moved from the "die open" to the "die closed" position—to initiate the first half of the cycle of operations—with the result that air is directed from the valve 85 to the cam-actuated valve 80 instead of to the die-control valve 94, that delivery port of the valve 85 being of restricted size, is about 3/64" diameter. Thus, as there is no longer any air in the pilot circuit comprising the valve 86 and reservoir 96, the die control valve 94 is reversed so that air from the main air supply is directed to the outer ends of the cylinders of the rams 36, so as to cause the die mounting plates 33, 34 to be moved inwardly, and the air is exhausted from the inner ends of the rams 36 at a rate controlled by the regulator valves 83. The rate of closing movement of the die-mounting plates 33, 34 is thus controlled.

With the initial movement inwards of the die-mounting plate 34 the cam 76 is disengaged from the valve 81 so that there is no longer any supply of air from that valve to the lift control valve 89, but as air is then piloted from the manual control valve 85 to the cam-actuated valve 80, and as that valve 80 is not at that juncture engaged by its cam 74, the air from the manual control valve 85 is piloted through the cam-actuated valve 80 to the lift control valve 89 so as to maintain that valve in the "platform up" position. There is thus no real change in the lift control valve 89 or in the cam-actuated valve 80, the only change being that the pilot air is derived from a different valve. As the cam-actuated valve 80 has not been operated there is still no air supply to the hollow mandrel.

Although the inward movement of the plate 33 has resulted in the disengagement of the cam 78 from the valve 82, with the consequential opening of the circuit through that valve from the lift-control valve 89 to the upper end of the mandrel-actuating ram 50, the ram 50 is not operated for the reason that there is no air under pressure in that circuit, the air line being open to atmosphere as shown in FIG. 7.

As the closing of the plates 33, 34 is continued still further the cam 74 is moved into engagement with the valve 80—see FIG. 8—and that valve 80 is actuated so that the supply of air from the manual control valve 85 is re-directed to the blowing delay valve 90 and thence to the blow-control valve 97, which is actuated and opened by the pressure of that air from the valve 80. For convenience of installation the valve 97 is mounted at the rear of the bracket 67 at the right-hand side of the machine; see FIG. 2.

A supply of refrigerated air is connected to the blow-control valve 97, and it is preferred that this air supply be not lubricated, and that it be clean, so that the air will not have any deleterious effect upon the inside of the plastic material to be blown to shape. The valve 97 is of a type that does not require much lubrication for its operation and any lubricant required will be supplied by the pilot air from the cam-actuated valve 80.

The refrigerated, clean air is caused to flow from the blow-control valve 97 to the pressure regulator 65, the pressure being indicated by the gauge 63, and thence to the bottom of the tubular member 43. That air is blown through the air holes 46, circulated through the formed hollow article, and then exhausted through the nozzle tube 54, outlet 55 and exhaust pressure regulator valve 62 to the silencer 66. A quantity of the exhaust air is supplied to the C-shaped tube 57 and is blown through the nozzles or outlets at the opposite ends of that tube on to the outer surface of the extruded material immediately above the die parts 37.

With the re-directing of the pilot air, from the manual control valve 85, to the blow-delay valve 90 and blow control valve 97, there is then no pilot air supply to the lift control valve 89 and as a result the operation of that valve 89 is reversed. The reversal of the valve 89 is effected at about the same time as the actuation of the blow-control valve 97 as controlled by the valve 90. Upon reversal of the lift control valve 89 the main air supply to the cylinders of the rams 18 is reversed, with the result that the platform is lowered, the rate of drop being controlled by the regulator valve 91.

At the same time as air is supplied to the lower ends of the rams 18 air is supplied from the lift-control valve 89 to the cam-actuated valve 82 and thence to a reservoir or pressure cylinder 98 so as to charge that cylinder.

At the conclusion of the stage depicted in FIG. 8 the die mounting plates 33, 34 have been fully closed, the platform 22 has then been lowered, and air is being blown through the hollow nozzle 45 to effect cooling of the formed hollow article. That completes the first half of the cycle of operations, or the first automatic sequence of operations, and the machine will remain in the position as stated until the manual control valve 85 is again operated.

When the manual control valve 85 is operated again, so as to put the control handle back to the "die-open" position as shown in FIG. 9 and thereby initiate the second half of the automatic cycle of operations, the flow of air in that valve 85 is again reversed. Then, as there is no pilot air supply to the cam-actuated valve 80, from either the manual control valve 85 or the cam-actuated valve 81, there is no pilot air supply to the blow-control valve 97 and, therefore, that valve is shut so as to shut off the flow of clean refrigerated air to the hollow mandrel 45. Thus, the blowing and cooling operation ceases.

Main air is then piloted from the manual control valve 85 through the delay control valve 86 and reservoir 96 to the die-control valve 94. The operation of the valve 94 is delayed by the valve 86 so as to provide a short time interval within which to exhaust the air pressure within the formed hollow article—as otherwise the article might be distorted by the internal pressure of air. On the operation of the valve 94, to reverse the flow of the main air supply through it, the supply of air to the two die-operating rams 36 is reversed, so as to cause the die-mounting plates 33, 34 to be opened.

In the initial opening movement of the plates 33, 34 the cam 74 is disengaged from the valve 80. There is no alteration in the lift-control valve 89 or in the mandrel actuating ram 50, so the platform 22 remains down and the mandrel 45 remains extended.

As the opening of the die-mounting plates 33, 34 is continued—as shown in FIG. 10—there is no alteration in the valves 85, 94, 80, 81, 97 and 89, but on engagement of the valve 82 by its operating cam 78 the flow of air from the valve 89 to the reservoir 98 is shut off and re-directed to the upper end of the cylinder of the mandrel actuating ram 50 so as to cause the mandrel 45 to be retracted to its full extent against the tension of the springs 53. At the same time a connection is effected, within the valve 82, between the compressed air reservoir 98 and the ejector nozzle 59 so that air from the reservoir 98 is blown through the nozzle 59 to cause the formed hollow article to be ejected from between the die-mounting plates 33, 34.

At that stage, as shown in FIG. 10, the opening movement of the plates 33, 34 has not been completed as the cam 76 has not been brought into engagement with the valve 81. Upon that engagement being effected the valve 81 is operated—as shown in FIG. 5—so that air is piloted from the valve 81 through the valve 80, the delay control valve 87, needle valve 88, and reservoir 95, to the lift control valve 89. That pilot air causes the valve 89 to be reversed so that the platform 22 is raised again. With the reversal of the valve 89 the supply of air to the mandrel actuating ram 50 is also discontinued, with the result that the hollow mandrel 45 is moved upwardly relative to the platform 22.

The remaining valves stay as they were, and as shown in FIG. 10.

The pneumatic rams and valves in the apparatus may conveniently be of commercial origin, such as those known by the trade mark "Martonair." For example, we have found that a "Martonair" valve No. 528/7 is satisfactory for the manual control valve 85, that "Martonair" valve No. 562/2 is satisfactory for use both as the die control valve 94 and the hoist control valve, that "Martonair" valve No. 556/8 is satisfactory for both the cam-actuated valves 80 and 82, that "Martonair" valve No. 560/8 is satisfactory for the cam-actuated valve 81, that "Martonair" valve No. 534/4 is satisfactory for the blow control valve 97, and "Martonair" valves Nos. 577 and 557 are satisfactory for the delay control valves 87, 90 and 86. The delay-control valves are adjustable one-way regulator valves and by means of them may be effected adjustment of the time taken for the different operations controlled by said valves.

The automatic controls for the machine are illustrated diagrammatically in FIG. 11, and they include the electronic timer 69, the timer re-setting switch 70 and the automatic control valve 84, together with an actuating cylinder 101 mounted on the base of and connected mechanically to, the manual control valve 85, a control valve 102 and an electrically operated air valve, or solenoid valve, 103. The timer 69 has a pilot light 104 mounted in it, and electrical terminals 105, 106 of the timer 63 and solenoid valve 103, respectively, are connected to one terminal of an A.C. electricity supply. The other electrical terminal of the solenoid valve 103 is connected to one terminal of the pilot light 104 and the other terminal of that pilot light is connected to the other terminal of the A.C. electricity supply. The air connection 107 of the valve 103 is connected to the control valve 102 at 108, and the other air connection of that valve 103 is connected to the control valve 102 and to the automatic control valve 84. Cylinder ports 109, 110 of the control valve 102 are connected to the actuating cylinder 101 at 111 and 112, respectively.

We have found that "Martonair" valve No. 556/13 is satisfactory as the automatic control valve 84, that "Martonair" cylinder 549/1¼" is satisfactory as the actuating cylinder 101, and that "Martonair" valves Nos. 556/12 and 557/1 are satisfactory as the control valve 102 and solenoid valve 103 respectively. As the timer 69 we have used an A.E.I. Electronic Time Delay Relay Type IC 3960, having a time range from 0.7 sec. to 15 sec.

The automatic control mechanism described above is set in use by operating the extruder at about its running speed and, with the electrical circuit switched on, working the machine manually. The timer is adjusted so that the pilot light 104 is set to synchronise with the operation of the manual control valve 85. When the correct timing has been obtained the push button of the automatic control switch 84 is pulled out so as to supply air from the main supply to the control valve 102 and solenoid valve 103. Air is directed alternately to opposite ends of the actuating cylinder 101 from the control valve 102, and said cylinder 101 actuates the valve 85. The control valve 102 is operated by air piloted to it from the connection 107 of the solenoid valve 103, as controlled by the timer 69 and switch 70.

When the platform 22 is raised to its upper position the switch lever 71 actuates the timer setting switch 70 so as to operate the control valve 102 and, thereby, the manual control valve 85, moving it from the "die-open" to the "die-closed" position. The sequence of operations is then carried out as described above, and on the lowering of the platform 22 after the closing of the plates 33, 34 the timer setting switch 70 is released to set the timer 69 for controlling the duration of the blowing and cooling operation. At the conclusion of that pre-determined time the timer 69, operating through the solenoid valve 103, control valve 102 and actuating cylinder 101, causes the manual control valve 85 to be moved back to the "die-open" position. The complete cycle of operations is thus carried out automatically.

The pipes or tubes used for connecting together the different valves, cylinders and gauges of the pneumatic apparatus are of relatively rigid material—as metal tubes—except for the connection from the regulator 65 to the tubular member 43 and the connection from the co-axial tube 47 to the somewhat C-shaped tube 57. Those latter connections are made of flexible material as the lower end portion of the tubular member 43 moves relative to the platform 22. All the other connections of the pneumatic system, from the main valve 92 onwards, are in fixed position relative to the platform 22 and, therefore, metal tubes may be used for making the connections. This enables the cycle of operations of the machine to be speeded up as flexible pipe lines tend to swell when air under pressure is fed into them and, as a result, there is a delay in the operation of the valve or other apparatus to be actuated.

The complete cycle of operations of the machine, when on automatic operation, is as follows, commencing from the "neutral" position with the platform 22 raised, the die open, and the hollow mandrel engaged in the lower end portion of a tube extending from the extrusion head 20.

The die parts 37 are closed at a regulated speed so that the plastic tube is clamped between them, and the upper end portion of the tube within the die is closed by the die. On the completion of the die-closing operation the control valve 80 is actuated by the cam 74 and immediately the lift-control valve 89 is reversed so that the platform commences to move downwardly at a rate controlled by the regulator valve 91. When that downward movement commences the extruded plastic above the die breaks at or a short distance below the extrusion nozzle. At a pre-set time interval after the closing of the die parts 37, as controlled by the delay valve 90, air is blown into the interior of the plastic tube that is clamped in the die so as to force it to the internal shape of the die.

The blowing of the plastic material to the internal shape of the die takes only a very brief time—in fact, it is almost instantaneous—but it is necessary to maintain fluid pressure within the formed hollow article to ensure that the formed shape is retained. Also, it is necessary to cool the formed hollow article so that it will retain its shape after ejection from the die. For that purpose air blown into the formed hollow article through the air holes 46 in the mandrel 45 is exhausted through the nozzle 54 so as to provide for a circulation of cooling fluid through the interior of the hollow article, the fluid pressure within the formed hollow article being maintained at a desired level by the regulator valve 62. Portion of that exhaust air is blown continuously on the short length of extruded tube just above the die so as to cool it a sufficient degree to permit it to be handled by an operator, and broken off the formed hollow article, when ejected from the opened die.

The cooling operation continues during the lowering of the platform 22 and for a total time, after the platform 22 commences to drop, as determined by the electronic timer 69, and during the cooling operation the die parts 37 are held in closed position.

When the cooling has been completed the valve 97 is shut so as to shut off the supply of cooling fluid to the interior of the formed hollow article and after a suitable pre-set time delay, as controlled by the delay valve 86 and reservoir cylinder 96, the die parts 37 are moved apart. Then, after a further time delay, controlled by the position of the cam 78 on its supporting arm 79, the hollow mandrel 45 is retracted from within the formed hollow article and that article is blown from between the opened die parts 37 by a blast of air from the ejector nozzle 59.

Almost immediately after the ejection of the formed and cooled hollow article the platform 22 is raised again, the time delay after the opening of the die parts 37 being controlled by the delay valve 87 and reservoir 95. When the platform 22 is raised, with the die parts 37 open, the press is back in its initial position ready for a fresh cycle of operations.

It will be noted from the foregoing description of the operation of the machine that each step in the cycle of operations is subject to individual control, so that the timing for each operation may be altered as required. Thus, the cooling time may be increased without any alteration being required in any other step. That would increase the overall time for a complete cycle of operations—but if it be desired to increase the cooling time without increasing the overall time some other operation or operations may be speeded up. For example, the delay in initiating the closing of the die parts 37 may be reduced, or the rate of closing may be increased, or the delay in lifting the platform 22 may be reduced. And if it be found that the rate of operation of the machine is greater than is required to comply with the output of the extruder 20—obviously, the extruder sets the maximum limit on the output of the blow-moulding machine—any one or more of the time delays may be increased so as to slow down the output of the blow-moulding machine. The locations of the cams 74, 76 and 78 on their arms 75, 77 and 79, respectively, may be adjusted as desired to alter the timing of the operations controlled by them, or as may be required due to differences in sets of die parts 37.

Adjustments of the apparatus may be made so as to make alterations in the sequence of operations. For example, the hollow mandrel 45 may be held in its retracted position until after the platform 22 has been raised, or until just before the blowing operation is to commence. In order to do that it would be sufficient to incorporate a one-way valve in the air supply line from the valve 82 to the top of the mandrel-actuating ram 50 so as to hold the air pressure in the top of the ram cylinder after the lift-control valve 89 has been reversed and to provide cam means operable upon the lifting of the platform 22, or upon the closing of the die parts 37, for opening that valve, releasing the pressure and permitting the mandrel 45 to be moved upwardly.

Also, there may be incorporated a two-way delay valve instead of the one-way delay 87 in the control circuit for the lift-control valve, so as to provide a delay in the drop of the platform 22.

The connections of the somewhat C-shaped tube 57 may be altered so that it is connected to the cam-actuated valve 80 instead of to the exhaust from the nozzle tube 54, so that air will be blown from it immediately upon the valve 80 being actuated by the cam 74 in order that air will be blown on to the extruded plastic material immediately the die closes and thereby ensure that the plastic material breaks relatively cleanly when the die is lowered.

If desired, the improvements of this machine may be incorporated in a machine constructed so that the die parts 37 are moved horizontally instead of vertically, or in a machine made so that the die parts 37 are moved in an arcuate path away from the extrusion nozzle.

It is to be realized that although we have given examples of the different valves and timer apparatus which we have found to be suitable for use in the machine other valves and/or timers may be used. It may also be found satisfactory to use fluid-operated timers instead of an electronic timer. Moreover, it may be found desirable to use fluids other than air for the blowing and/or cooling operations—such as other gases or even liquids such as water—and that instead of using extruded tubular material it may be found desirable to use sheet material—such as two sheets extruded simultaneously in parallel relationship. Also, depending upon the nature of the article to be blow-moulded, there may be employed two or more mandrels for the blowing operation, or one mandrel at one location and an exhaust tube at another location.

All such modifications as come within the broad scope of the appended claims are to be deemed to be included within the ambit of the invention.

What we claim is:

1. In blow-molding apparatus; a platform, means to reciprocate the platform toward and away from an extrusion nozzle, pneumatically operated means carried by the platform to reciprocate cooperating die sections between closed and opened positions and thereby enclose an exudate from such extrusion nozzle, blow means carried by the plaform for reciprocation toward and away from said die sections for blowing engagement therewith when in said closed position, pneumatically operated means carried by said platform to effect such reciprocation of the blow means, means for supplying a fluid to said blow means to effect a blowing operation, control means for each of said pneumatically operated means to adjust each defined operation independently of the others, a pneumatic circuit joining said pneumatically operated means effective to avoid delay in the operation thereof, and a manual control adapted to be operated so as to alter the sequence of operations.

2. In blow-molding apparatus; a platform, means to reciprocate the platform toward and away from an extrusion nozzle, pneumatically operated means carried by the platform to reciprocate cooperating die sections between closed and opened positions and thereby enclose an exudate from such extrusion nozzle, blow means carried by the platform for reciprocation toward and away from said die sections for blowing engagement therewith when in said closed position, pneumatically operated means carried by said platform to effect such reciprocation of the blow means, means for supplying a fluid to said blow means to effect a blowing operation, control means for each of said pneumatically operated means to adjust each defined operation independently of the others, a pneumatic circuit joining said pneumatically operated means effective to avoid delay in the operation thereof, and a delay-control member in said pneumatic circuit to the means for opening and closing the die sections.

3. In blow-molding apparatus; a platform, means to reciprocate the platform toward and away from an extrusion nozzle, pneumatically operated means carried by the platform to reciprocate cooperating die sections between closed and opened positions and thereby enclose and exudate from such extrusion nozzle, blow means carried by the platform for reciprocation toward and away from said die sections for blowing engagement therewith when in said closed position, pneumatically operated means carried by said platform to effect such reciprocation of the blow means, means for supplying a fluid to said blow means to effect a blowing operation, control means for each of said pneumatically operated means to adjust each defined operation independently of the others, a pneumatic circuit joining said pneumatically operated means effective to avoid delay in the operation thereof, and means for regulating the rate of closing of the die sections.

4. In blow-molding apparatus; a platform, means to reciprocate the platform toward and away from an extrusion nozzle, pneumatically operated means carried by the platform to reciprocate cooperating die sections between closed and opened positions and thereby enclose an exudate from such extrusion nozzle, blow means carried by the platform for reciprocation toward and away from said die sections for blowing engagement therewith when in said closed position, pneumatically operated means carried by said platform to effect such reciprocation of the blow means, means for supplying a fluid to said blow means to effect a blowing operation, control means for each of said pneumatically operated means to adjust each defined operation independently of the others, a pneumatic circuit joining said pneumatically operated means effective to avoid delay in the operation thereof, and a delay-control member in said pneumatic circuit to the means for reciprocating the platform.

5. In blow-molding apparatus; a platform, means to reciprocate the platform toward and away from an extrusion nozzle, pneumatically operated means carried by the platform to reciprocate cooperating die sections between closed and opened positions and thereby enclose an exudate from such extrusion nozzle, blow means carried by the platform for reciprocation toward and away from said die sections for blowing engagement therewith when in said closed position, pneumatically operated means carried by said platform to effect such reciprocation of the blow means, means for supplying a fluid to said blow means to effect a blowing operation, control means for each of said pneumatically operated means to adjust each defined operation independently of the others, a pneumatic circuit joining said pneumatically operated means effective to avoid delay in the operation thereof, and control means for preventing operation of the platform-reciprocating means so that the platform may be held in one position while other operations in the cycle are carried out.

6. In blow-molding apparatus; a platform, means to reciprocate the platform toward and away from an extrusion nozzle, pneumatically operated means carried by the platform to reciprocate cooperating die sections between closed and opened positions and thereby enclose and exudate from such extrusion nozzle, blow means carried by the platform for reciprocation toward and away from said die sections for blowing engagement therewith when in said closed position, pneumatically operated means carried by said platform to effect such reciprocation of the blow means, means for supplying a fluid to said blow means to effect a blowing operation, control means for each of said pneumatically operated means to adjust each defined operation independently of the others, a pneumatic circuit joining said pneumatically operated means effective to avoid delay in the operation thereof, and a delay-control member in said pneumatic circuit for said means for supplying fluid to said blow means.

7. In blow-molding apparatus; a platform, means to reciprocate the platform toward and away from an extrusion nozzle, pneumatically operated means carried by the platform to reciprocate cooperating die sections between closed and opened positions and thereby enclose an exudate from such extrusion nozzle, blow means carried by the platform for reciprocation toward and away from said die sections for blowing engagement therewith when in said closed position, pneumatically operated means carried by said platform to effect such reciprocation of the blow means, means for supplying a fluid to said blow means to effect a blowing operation, control means for each of said pneumatically operated means to adjust each defined operation independently of the others, a pneumatic circuit joining said pneumatically operated means effective to avoid delay in the operation thereof, and means for blowing coolant air at a location a short distance above the die sections when in closed position.

8. In blow-molding apparatus; a platform, means to reciprocate the platform toward and away from an extrusion nozzle, pneumatically operated means carried by the platform to reciprocate cooperating die sections between closed and opened positions and thereby enclose an exudate from such extrusion nozzle, blow means carried by the platform for reciprocation toward and away from said die sections for blowing engagement therewith when in said closed position, pneumatically operated means carried by said platform to effect such reciprocation of the blow means, means for supplying a fluid to said blow means to effect a blowing operation, control means for each of said pneumatically operated means to adjust each defined operation independently of the others, and a pneumatic circuit joining said pneumatically operated means effective to avoid delay in the operation thereof, said means for supplying fluid to the blow means being adapted to be actuated by the closing of the die sections.

9. In blow-molding apparatus; a platform, means to reciprocate the platform toward and away from an extrusion nozzle, pneumatically operated means carried by the platform to reciprocate cooperating die sections between closed and opened positions and thereby enclose an exudate from such extrusion nozzle, blow means carried by the platform for reciprocation toward and away from said die sections for blowing engagement therewith when in said closed position, pneumatically operated means carried by said platform to effect such reciprocation of the blow means, means for supplying a fluid to said blow means to effect a blowing operation, control means for each of said pneumatically operated means to adjust each defined operation independently of the others, and a pneumatic circuit joining said pneumatically operated means effective to avoid delay in the operation thereof, wherein the means for reciprocating the platform toward the extrusion nozzle is adapted to be actuated by the opening of the die sections.

10. In blow-molding apparatus; a platform, means to reciprocate the platform toward and away from an extrusion nozzle, pneumatically operated means carried by the platform to reciprocate cooperating die sections between closed and opened positions and thereby enclose an exudate from such extrusion nozzle, blow means carried by the platform for reciprocation toward and away from said die sections for blowing engagement therewith when in said closed position, pneumatically operated means carried by said platform to effect such reciprocation of the blow means, means for supplying a fluid to said blow means to effect a blowing operation, control means for each of said pneumatically operated means to adjust each defined operation independently of the others, a pneumatic circuit joining said pneumatically operated means effective to avoid delay in the operation thereof, and means for controlling the duration of the supply of fluid to said blow means.

11. In blow-molding apparatus; a platform, means to reciprocate the platform toward and away from an extrusion nozzle and past a stationary part of said apparatus whereby said part and said platform define cooperating relatively movable members, pneumatically operated means carried by the platform to reciprocate cooperating die sections between closed and opened positions and thereby enclose an exudate from such extrusion nozzle, blow means carried by the platform for reciprocation toward and away from said die sections for blowing engaegment therewith when in such closed position, pneumatically operated means carried by said platform to effect such reciprocation of the blow means, means to supply a fluid to said blow means to effect a blowing operation, control means for each of said pneumatically operated means to adjust each defined operation individually of the others, and a pneumatic circuit joining said pneumatically operated means effective to avoid delay in the operation thereof, said control means including a switch-operating cam mounted on one of said cooperating relatively movable members and a switch engageable with the cam mounted on the other of said relatively movable members, whereby upon movement of the platform past said stationary part resultant contact between said cam and switch stops movement of the platform and initiates movement of the die sections to their closed position through said first-mentioned pneumatically operated means.

12. In blow-molding apparatus; a platform, means to reciprocate the platform toward and away from an extrusion nozzle, opposed pneumatically operated means supported by the platform for movement toward and away from each other, a guide rail carried by the platform and extending generally in the direction of said movement of said pneumatically operated means, a mounting plate fixed to each of said opposed means and slidably engaging the guide rail for movement therealong, each of said mounting plates defining with said platform cooperating relatively movable members, mating die sections carried by said mounting plates and reciprocated by said opposed means between opened and closed position to enclose an exudate from such extrusion nozzle, blow means carried by the platform for reciprocation toward and away from said die sections for blowing engagement therewith when in said closed position, pneumatically operated means carried by said platform to effect such reciprocation of the blow means, means to supply a fluid to said blow means to effect a blowing operation, control means for each of said pneumatically operated means to adjust each defined operation independently of the others, and a pneumatic circuit joining said pneumatically operated means effective to avoid delay in the operation thereof, said control means including three switch-operating cams each fixed with respect to one of said cooperating relatively movable members, and three switches each cooperating with a different one of said cams and fixed with respect to the other of said cooperating relatively movable members, whereby upon movement of a mounting plate along said guide rail and resulting contact between such three sets of cooperating cams and switches, one set initiates the supply of such fluid to the blow means, another set initiates retraction of said blow means from the die sections, and the final set initiates movement of the platform with respect to such extrusion nozzle.

13. In blow-moulding apparatus; upstanding column members, a platform having sleeve members to engage the column members, pneumatic ram means bearing against one side of the platform to reciprocate such platform along the columns toward and away from an extrusion nozzle, opposed pneumatic ram means carried on the platform to reciprocate across the platform co-operating die sections between closed and opened positions and thereby enclose an exudate from such extrusion nozzle, said platform having an opening substantially coaxially with said die sections in their closed position, a mandrel of concentric tubes mounted on the platform for longitudinal reciprocation through such opening, pneumatic ram means carried beneath said platform to effect such longitudinal reciprocation of the mandrel, means to supply a fluid under pressure to one concentric tube of the mandrel and effect a blowing operation and to remove the fluid through the other of said concentric tubes, individual control means for each of said pneumatic ram means to adjust each defined operation indiviidually of the others, and a pneumatic circuit joining said pneumatically operated means of substantially rigid connections to avoid delay in the operation thereof, said control means including a switch-operating cam adjustably mounted along one of said columns and a switch engageable therewith mounted on said platform, whereby upon movement of the platform along the columns resultant contact between said cam and switch stops movement of the platform and initiates movement of the die sections to their closed position through said opposed pneumatic ram means.

14. In blow-moulding apparatus; substantially vertically disposed column members, a platform having sleeve members to engage the column members, pneumatic ram means bearing against the underside of the platform to reciprocate the platform vertically along the columns toward and away from an extrusion nozzle, opposed brackets carried on the platform, opposed pneumatic ram means supported by the brackets for movement across the platform toward and away from each other, a guide rail extending between said brackets and carried thereby, a mounting plate fixed to each of said opposed pneumatic ram means and slidably engaging the guide rail for movement therealong, mating die sections carried by said mounting plates and reciprocated by said opposed pneumatic ram means between opened and closed positions to enclose an exudate from such extrusion nozzle, said platform having an opening substantially coaxial with said die sections in their closed position, a mandrel of concentric tubes mounted on the platform for longitudinal reciprocation through such opening, pneumatic ram means carried beneath said platform to effect such longitudinal reciprocation of the mandrel, means to supply a fluid under pressure to one concentric tube of the mandrel and effect a blowing operation and to remove the fluid through the other of said concentric tubes, individual control means for each of said pneumatic ram means to adjust each defined operation independently of the others, and a pneumatic circuit joining said pneumatically operated means of substantially rigid connections to avoid delay in the operation thereof, said control means including three switch-operating cams each fixed with respect to a mounting plate and movable therewith, and three switches each co-operating with a different one of said cams and fixed with respect to the platform, whereby upon movement of a mounting plate across said platform and resulting contact between such three sets of co-operating cams and switches, one set initiates the supply of such pressurized fluid to the mandrel, another set initiates retraction of said mandrel through said platform opening by said pneumatic ram means beneath the platform, and the final set initiates movement of the platform along the columns toward such extrusion nozzle by said pneumatic ram means bearing against said platform.

15. In blow-moulding apparatus; substantially vertically disposed column members, a platform having sleeve members to engage the column members, pneumatic ram means bearing against the underside of the platform to reciprocate the platform vertically along the columns toward and away from an extrusion nozzle, opposed brackets carried on the platform, opposed pneumatic ram means supported by the brackets for movement across the platform toward and away from each other, a guide rail extending between said brackets and carried thereby, a mounting plate fixed to each of said opposed pneumatic ram means and slidably engaging the guide rail for movement therelong, mating die sections carried by said mounting plates and reciprocated by said opposed pneumatic ram means between opened and closed positions to enclose an exudate from such extrusion nozzle, said platform having an opening substantially coaxial with said die sections in their closed position, a mandrel of concentric tubes mounted on the platform for longitudinal reciprocation through such opening, means to effect such longitudinal reciprocation of the mandrel including additional pneumatic ram means carried beneath said platform to retract the mandrel and resilient means urging the mandrel upwardly through such platform opening, means to supply a fluid under pressure to one concentric tube of the mandrel and effect a blowing operation and to remove the fluid through the other of said concentric tubes, individual control means for each of said pneumatic ram means to adjust each defined operation independently of the others, and a pneumatic circuit joining said pneumatically operated means of substantially rigid connections to avoid delay in the operation thereof by swelling of such connections, said control means including a switch-operating cam adjustably mounted along one of said columns and a switch engageable therewith mounted on said platform, whereby upon movement of the platform along the columns, resultant contact between said cam and switch stops movement of the platform and initiates movement of the die sections to the closed position through said opposed pneumatic ram means, said control means further including three switch-operating cams each fixed with respect to a mounting plate and movable therewith, and three switches each co-operating with a different one of said cams and fixed with respect to the platform, whereby upon movement of a mounting plate across said platform and resulting contact between such three sets of co-operating cams and switches, one set initiates the supply of such pressurized fluid to the mandrel, another set initiates retraction of said mandrel through said platform opening by said pneumatic ram means beneath said platform, and the final set initiates movement of the platform along the columns toward such extrusion nozzle by said pneumatic ram means bearing against said platform.

16. A blow-molding machine as claimed in claim 1 wherein the manual control is so constructed that it is adapted to initiate part of the cycle of operations when moved to one operative position and to initiate the remainder of the cycle of operations when moved to another operative position.

17. A blow-molding apparatus according to claim 7 wherein there are means for ejecting a formed hollow article from the apparatus and said ejection means include a nozzle arranged so as to direct a blast of air on to the formed hollow article when the die sections have been opened.

18. A blow-molding apparatus according to claim 7 wherein there are means for ejecting a formed hollow article from the apparatus, said ejection means including a nozzle arranged so as to direct a blast of air on to the formed hollow article when the die sections have been opened, and means for supplying air under pressure to said ejection nozzle when the die sections have been opened, said air-supply means being adapted to be actuated by the opening of the die sections.

19. A blow-molding apparatus according to claim 10 wherein the means for controlling the duration of supply of fluid to the blow means is adapted to be actuated by the movements of the platform in its travel relative to the extrusion nozzle.

References Cited in the file of this patent

UNITED STATES PATENTS

| | | |
|---|---|---|
| 2,928,120 | Leghorn et al. | Mar. 15, 1960 |
| 2,943,349 | Adams et al. | July 5, 1960 |

FOREIGN PATENTS

| | | |
|---|---|---|
| 203,385 | Australia | Sept. 27, 1956 |
| 1,105,529 | France | Dec. 5, 1955 |
| 744,927 | Great Britain | Feb. 15, 1956 |